May 12, 1953  I. B. CHANDLER  2,638,118
CONTROL MECHANISM FOR PREVENTING MOTOR VEHICLES FROM
CREEPING WITH PROVISION FOR MAINTAINING A
CONSTANT RESTRAINING FORCE
Filed Nov. 5, 1949
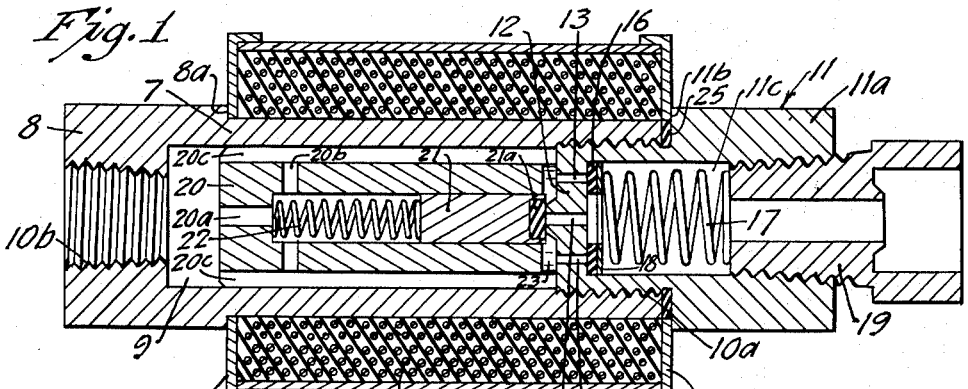
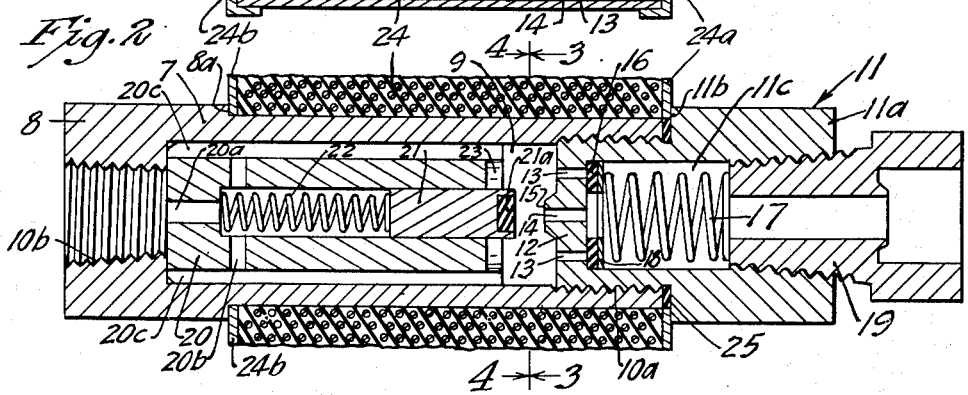
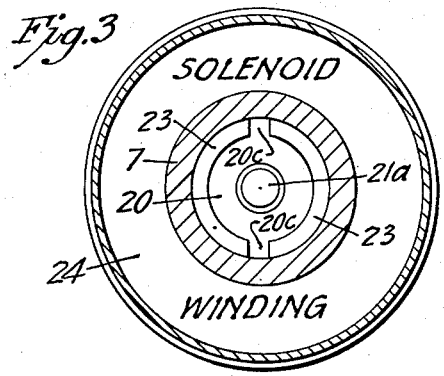
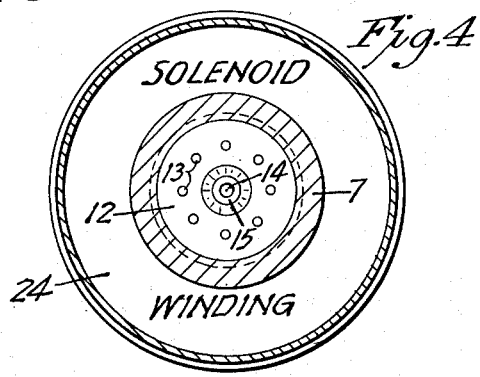
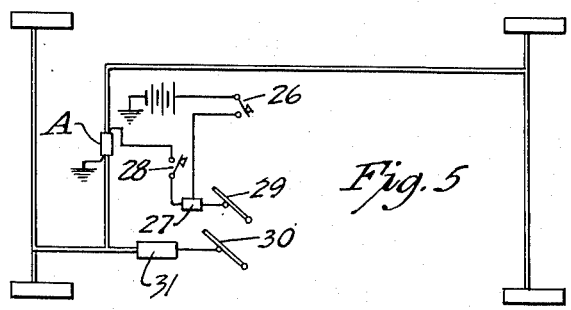
Inventor
Irvin B. Chandler
By Williamson & Williamson
Attorneys Patented May 12, 1953

2,638,118

UNITED STATES PATENT OFFICE 2,638,118

CONTROL MECHANISM FOR PREVENTING MOTOR VEHICLES FROM CREEPING WITH PROVISION FOR MAINTAINING A CONSTANT RESTRAINING FORCE

Irvin B. Chandler, Mankato, Minn., assignor to Minnesota Automotive, Inc., Minneapolis, Minn., a corporation of Minnesota Application November 5, 1949, Serial No. 125,772

5 Claims. (Cl. 137—598)

1

This invention relates to a brake control mechanism to prevent creeping of a motor vehicle and is closely related to an application filed in the name of Simon W. Fraser and Irvin B. Chandler on January 3, 1949, Serial No. 68,886, entitled Control Mechanism for Cooperation with a Fluid Brake System to Prevent Creeping of a Motor Vehicle.

Although the mechanism disclosed in the above identified application operates very successfully, it has been found that variations in the current due to variations in generator output, battery condition, and temperature of the solenoid coil produce a variance in the force exerted by the valve, and therefore in the pressure both maximum and minimum which is maintained in the fluid supply lines of the brake system.

It is an object of my present invention to produce a mechanism for the same general purposes as the mechanism disclosed in the above identified application, but providing mechanism whereby variations in the current through the solenoid will not cause any variation in the pressure maintained in the fluid supply line.

More specifically, it is an object to provide a ferrous metal plunger adapted to be actuated by an electrical conductive coil to project the same into a precisely predetermined position, said plunger carrying a valve element in sliding relation thereto and having a resilient element mounted in said plunger for urging said valve element outwardly against a fixed valve seat with a precisely predetermined pressure when said plunger is in projected position.

These and other objects and advantages of my invention will more fully appear from the following description made in connection with the accompanying drawings wherein like reference characters refer to similar parts throughout the several views and in which:

Fig. 1 is a longitudinal vertical sectional view taken substantially through the center line of my improved mechanism, showing the plunger and valve in closed energized position;

Fig. 2 is a similar view showing the plunger and valve in retracted de-energized position;

Fig. 3 is a transverse vertical sectional view taken substantially along the line 3—3 of Fig. 2;

Fig. 4 is a transverse vertical sectional view taken substantially along the line 4—4 of Fig. 2, and;

Fig. 5 is a diagrammatic view showing my control mechanism as connected in a conventional hydraulic brake system of a motor vehicle.

As illustrated in the accompanying drawings,

2

I provide a fluid control unit designated as an entirety by the letter A. This control unit has a casing member designated by the numeral 7 with an enlarged rear portion 8 of polygonal shape to receive a wrench thereon and forming an abutment shoulder 8a at the inner extremity thereof. The sleeve 7 has a cylindrical inner chamber 9 extending therethrough and both the inlet pressure end 10a and the outlet end 10b of said sleeve are internally threaded.

A ferrous metal core 11 is threadably inserted in end portion 10a and has an enlarged polygonal outer portion 11a to permit a wrench to be tightened thereon. This enlarged portion provides a shoulder 11b at the extremity of sleeve 7 adjacent end 10a thereof. The core member 11 is hollow and has a partition 12 formed at the outlet end thereof and said partition has passage means formed therethrough such as a plurality of flow passages 13 formed around the outer portion thereof and a central seated flow passage 14 formed in the center thereof. A valve seat 15 surrounds the inlet end of flow passage 14 and projects rearwardly into chamber 9 therefrom.

An annular check valve 16 is mounted in sealed relation against the outlet side of partition 12 to permit flow of fluid through the passages 13 in only one direction and positively prevent backflow therethrough. A spring 17 and annular reinforcing ring 18 are provided to resiliently hold said valve 16 against the outlet side of partition 12. Plug member 19 is threadably inserted in the outlet end of core 11 and forms a chamber 11c therein in addition to holding the spring 17 in position within said core member 11c. The spring, of course, is of very light tension to allow substantially unrestricted flow of fluid from chamber 9 into chamber 11c through passages 13.

A ferrous metal valve carrying plunger or body 20 is inserted in valve chamber 9 in sliding relation therein. The body 20 has a valve receiving recess formed longitudinally through the forward and central portion thereof and a valve 21 is slidably mounted therein. A spring 22 of accurately predetermined tension is mounted behind the valve member 21 to normally urge the same outwardly toward valve seat 15. A sealing element 21a is formed in the outer end portion of valve 21 to be sealingly seated against seat 15 when the body 20 is in forwardly projected position, as shown in Fig. 1. A stop element such as the annular ring 23 is formed at the forward end of body 20 to positively engage partition 12 and position said body 20 in a precisely predetermined projected position. This permits a precisely predetermined increment of compression to be produced in spring 22 when the body 20 is in forwardly projected position, and thereby exert a predetermined pressure on the valve 21 against seat 15. The body 20 has a number of by-pass flow passages formed therein, such as the longitudinal passage 20a, transverse passages 20b, and longitudinally formed groove passages 20c to permit unrestricted flow of fluid through chamber 9.

An annular coil of electric conductor wire 24 is concentrically mounted around the outer portion of sleeve 7 and a pair of annular end plates 24a and 24b are respectively fixed at the ends thereof to respectively abut the shoulders 11b and 8a. A sealing washer 25 is interposed between the shoulder 11b and the end of sleeve 7 adjacent thereto. The control mechanism disclosed in the foregoing description is connected on a conventional motor vehicle in the same manner as that described in my above identified co-pending application. In the form shown, the control is connected into the fluid supply line to the brake actuators of the rear wheel brakes with the plug 19 disposed toward said brake actuators. The three switches 26, 27 and 28 are respectively interposed into the solenoid circuit to control energization thereof. The switch 26 represents an ignition switch. Switch 27 is a switch actuated by the accelerator pedal 29, and is closed when the accelerator pedal is released. Switch 28 represents a manually operated master control switch which can be opened or closed under the control of the operator. 30 represents a conventional brake pedal, and 31 is a conventional master cylinder. As was described in my above identified co-pending application, both the ignition switch 26 and the master switch 28 must be closed, and whenever the accelerator pedal is completely released the solenoid coil 24 will be energized. The energization of the coil 24 produces a magnetic field and magnetizes the core member 11, which attracts the ferrous metal valve carrying body 20 to project said body forwardly and firmly engaged the abutment member 23 against the face of partition 12 on the inlet side thereof to precisely position said body relative to said partition and produce a predetermined increment of compression in spring 22. With the body 20 in projected position and the valve 21 seated against seat 15 fluid is still permitted to flow to the brake actuators through passages 20a, 20b and 20c, and outwardly from chamber 9 through passages 13 and into the fluid supply lines. When the brake pedal 30 is released and the fluid seeks to return, the check valve 16 seats itself to close off passages 13 and the only open passage permitting back flow of fluid is the central seated passage 14. The valve 21 and the pressure exerted thereby against said valve seat 15 by the compression of spring 22 directly opposes the back flow of fluid through seated passage 14 and thereby maintains a precisely predetermined residual pressure in the fluid supply line and holds the brakes in applied position with a predetermined force regardless of the magnetic thrust exerted by the coil 24 in excess of a predetermined minimum required force. Immediately upon de-energization of the coil 24, as by stepping on the accelerator pedal 29, the body 20 is permitted to shift rearwardly into retracted position, as shown in Fig. 2, and releases the compression from spring 22 and the pressure in the brake line. The increment of shifting movement of the body 20 is sufficient to permit the valve 21 to be shifted away from the seat 15 by the back-flow fluid pressure and permit complete expansion of the spring 22 and permit unrestricted flow of fluid back to the master cylinder.

It will be seen that my mechanism maintains a precisely predetermined pressure within the fluid supply line whenever the solenoid is energized at the time the brakes are applied. The solenoid is designed so that the amount of thrust thereon is always sufficient to project the plunger 20 firmly against the partition 12 regardless of minor variations in generator output, battery condition, and temperature of coil 24. In other words, my improved mechanism eliminates any maximum limit on the solenoid thrust since it is not the thrust of the solenoid that determines the force exerted upon the valve 21, but rather the thrust exerted by a predetermined increment of compression of the spring 22. The relation of the diameter of the passage 14 to the diameter of the hydraulic plungers in the brake actuators along with the force exerted by spring 22 determines the amount of force exerted on the brake actuators and can, of course, be varied to any desired degree by the manufacturer. Whenever the force exerted by the pressure on the fluid in the line exceeds the force exerted by the spring 22 fluid will be permitted to bleed back through seated passage 14 and return toward the master cylinder. By positioning the body 20 in a precise projected position the increment of compression in spring 22, and thus the force exerted thereby, will always be the same.

It will, of course, be understood that various changes may be made in the form, details, arrangements and proportions of the parts without departing from the scope of my invention.

What I claim is:

1. A fluid control valve for use with hydraulic brake systems and comprising a hollow casing member defining a valve chamber with a fluid inlet at the pressure end thereof and a fluid outlet at the other end thereof, a partition interposed across an intermediate portion of said chamber and having flow passage means formed therethrough, check valve means sealing off a portion of said passage means on the outlet side of said partition to prevent backflow of fluid therethrough, valve seat means surrounding the inlet side of the other passage means, a valve carrying body shiftably mounted in said chamber on the inlet side of said partition and constructed to permit unrestricted bypass flow of fluid in both directions, a valve shiftably mounted at the end of said body adjacent said partition and positioned to engage, when said body is shifted toward the inlet side of said partition said valve seat means surrounding the inlet side of said seated passage means and directly opposing the backflow of fluid therethrough, resiliently yieldable means permitting shifting movement of said valve relative to the body and urging said valve against said seat means with a predetermined force when said body is shifted toward said partition into projected predetermined relation thereto, and means for instantly projecting said body toward said partition.

2. A fluid control valve for use with hydraulic brake systems and comprising a hollow casing member defining a valve chamber with a fluid inlet at the pressure end thereof and a fluid outlet at the other end thereof, a ferrous metal partition interposed across an intermediate portion of said chamber and having flow passage means formed therethrough, check valve means sealing off a portion of said passage means on the outlet side of said partition to prevent back-flow of fluid therethrough, valve seat means surrounding the inlet side of the other passage means, a ferrous metal valve-carrying body shiftably mounted in said chamber on the inlet side of said partition and constructed to permit unrestricted by-pass flow of fluid in both directions, a valve shiftably mounted at the end of said body adjacent said partition and positioned to engage when said body is shifted toward the inlet side of said partition said valve seat means surrounding the inlet side of said seated passage means and directly opposing the back-flow of fluid therethrough, resiliently yieldable means permitting shifting movement of a valve relative to the body and urging said valve against said seat means with a predetermined force when said body is shifted toward said partition into predetermined projected relation thereto, and an electro-magnetic coil surrounding said ferrous metal partition and instantly shifting said ferrous metal body into projected predetermined relation to said partition when said coil is energized.

3. A fluid control valve for use with hydraulic brake systems and comprising a hollow casing member defining a valve chamber with a fluid inlet at the pressure end thereof and a fluid outlet at the other end thereof, a partition interposed across an intermediate portion of said chamber and having flow passage means formed therethrough, check valve means sealing off a portion of said passage means on the outlet side of said partition to prevent back flow of fluid therethrough, valve seat means surrounding the inlet side of the other passage means, a valve-carrying body shiftably mounted in said chamber on the inlet side of said partition and constructed to permit unrestricted by-pass flow of fluid in both directions, the end of said body adjacent said partition having a recess extending longitudinally rearwardly a substantial distance therein, a shiftable valve element mounted in said recess for longitudinal shifting movement relative to said body and having seat-engaging and sealing means at the partition end thereof constructed to engage when said body is shifted toward the inlet side of said partition said valve seat means surrounding the inlet side of said seated passage means and directly opposing the back-flow of fluid therethrough, resiliently yieldably means associated with said shiftable element for urging the same against said seat means with a predetermined force when said body is shifted into projected predetermined relation to said partition, and means for instantly shifting said body into projected predetermined relation to said partition.

4. A fluid control valve for use with hydraulic brake systems and comprising a hollow casing member defining a valve chamber with a fluid inlet at the pressure end thereof and a fluid outlet at the other end thereof, a partition interposed across an intermediate portion of said chamber and having flow passage means formed therethrough, check valve means sealing off a portion of said passage means on the outlet side of said partition to prevent back-flow of fluid therethrough, valve seat means surrounding the inlet side of the other passage means, a valve-carrying body shiftably mounted in said chamber on the inlet side of said partition and constructed to permit unrestricted by-pass flow of fluid in both directions, the end of said body adjacent said partition having a recess extending longitudinally rearwardly a substantial distance therein, a shiftable valve element mounted in said recess for longitudinal shifting movement relative to said body and having seat-engaging and sealing means at the partition end thereof constructed to engage when said body is shifted toward the inlet side of said partition said valve seat means surrounding the inlet side of said seated passage means and directly opposing the back-flow of fluid therethrough, a resiliently compressible member interposed between the rear end of said recess and said valve element for resiliently urging said valve element forwardly toward said partition, means for instantly shifting said body into projected predetermined relation to said partition, and positive stop means interposed between said partition and the adjacent end of said body to maintain a precisely predetermined projected position of said body relative to said partition whereby a precisely predetermined increment of compression is produced in said compressible member to resist with a predetermined force back-flow of fluid through said seated passage means when said body is in projected position.

5. A fluid control valve for use with hydraulic brake systems and comprising a hollow casing member defining a valve chamber with a fluid inlet at the pressure end thereof and a fluid outlet at the other end thereof, a partition interposed across an intermediate portion of said chamber and having flow passage means formed therethrough, check valve means sealing off a portion of said passage means on the outlet side of said partition to prevent back flow of fluid therethrough, annular valve seat means surrounding the inlet side of the other passage means and protruding rearwardly from said partition toward said fluid inlet and providing a flat sealing surface, a valve-carrying body shiftably mounted in said chamber on the inlet side of said partition and constructed to permit unrestricted by-pass flow of fluid in both directions, a valve shiftably mounted at the end of said body adjacent said partition and having a resilient slightly compressible sealing element mounted thereon and positioned to engage when said body is shifted toward the inlet side of said partition the flat sealing surface of said annular protruding valve seat means and directly opposing the back-flow of fluid through said seated passage means, resiliently yieldable means permitting shifting movement of said valve relative to the body and urging said valve sealing element against the flat sealing surface of said annular protruding seat means with a predetermined force when said body is shifted toward said partition into projected predetermined relation thereto, and means for instantly projecting said body toward said partition.

IRVIN B. CHANDLER.

References Cited in the file of this patent

UNITED STATES PATENTS

| Number | Name | Date |
| --- | --- | --- |
| 2,262,842 | Goepfrich | Nov. 18, 1941 |
| 2,297,076 | Sacks et al. | Sept. 29, 1942 |
| 2,329,156 | Coffey | Sept. 7, 1943 |
| 2,414,409 | Goepfrich | Jan. 14, 1947 |
| 2,472,544 | Nissen | June 7, 1948 |
| 2,502,118 | Ashton | Mar. 28, 1950 |